United States Patent [19]
Ling et al.

[11] Patent Number: 4,987,569
[45] Date of Patent: Jan. 22, 1991

[54] FAST TRAINING ECHO CANCELLER

[75] Inventors: Fuyun Ling, Jamaica Plain; Guozhu Long, Cambridge, both of Mass.

[73] Assignee: Codex Corporation, Mansfield, Mass.

[21] Appl. No.: 333,992

[22] Filed: Apr. 5, 1989

[51] Int. Cl.$^5$ .............................................. H04J 3/00
[52] U.S. Cl. ................................... 370/32.1; 379/410
[58] Field of Search ................. 379/410, 411; 370/32.1

[56] References Cited

U.S. PATENT DOCUMENTS

| | | |
|---|---|---|
| Re. 31,253 | 5/1983 | Weinstein . |
| 4,089,061 | 5/1978 | Milewski . |
| 4,126,770 | 11/1978 | Tamura et al. ...................... 379/410 |
| 4,621,173 | 11/1986 | Guidoux ............................. 379/411 |
| 4,682,358 | 7/1987 | Werner .............................. 379/411 |
| 4,813,073 | 3/1989 | Ling .................................. 379/410 |

OTHER PUBLICATIONS

J. Cioffi et al., "An Efficient RLS Data-Driven Echo Canceller for Fast Initialization of Full-Duplex Data Transmission", IEEE Transactions on Communications, vol. COMM-33, No. 7, Jul. 1986, pp. 601-611.

J. Cioffi, "A Fast Echo Canceller Initialization Method for the CCITT V32 Modem", GLOBECOM87, pp. 1950-1954.

T. Kamitake, "Fast Start-Up of an Echo Canceller in a 2-Wire Full-Duplex Modem", Links for the Future, 1984, pp. 360-364.

V. Kanchan et al., "Measurement of Echo Path Response", IEEE Transactions on Acoustics, Speech, and Signal Processings, vol. 36, No. 7, Jul. 1988, pp. 1008-1010.

M. Honig, "Echo Cancellation of Voiceband Data Signals Using Recursive Least Squares and Stochastic Gradient Algorithims", IEEE Transactions on Communications, vol. COM-33, No. 1, Jan. 1985, pp. 65-73.

*Primary Examiner*—Jin F. Ng
*Assistant Examiner*—Jhancy Augustus
*Attorney, Agent, or Firm*—Fish & Richardson

[57] ABSTRACT

An echo cancellation modem having a fast training echo canceller in which the echo cancellation coefficients are computed by taking correlations between a complex, periodic training signal sequence and a real component of the corresponding echo signal. The modem includes a receiver circuit for detecting a signal on a channel possibly including an echo; an echo canceller for estimating the real component of the echo signal; training circuitry for applying the complex training sequence to the channel and for taking correlations between the training sequence and the real component of the corresponding echo signal. The modem also includes a computational element for computing the period of the periodic sequence, generating the complex periodic train sequence in real time and for computing a phase roll frequency based upon the computed echo cancellation coefficients.

42 Claims, 8 Drawing Sheets

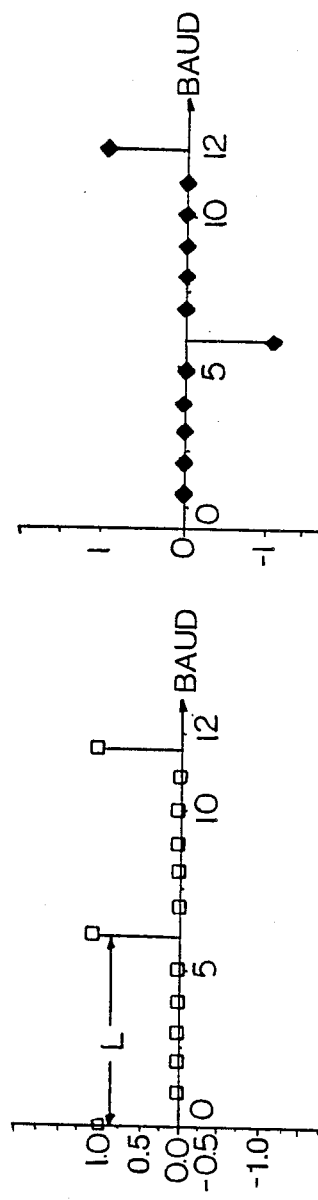
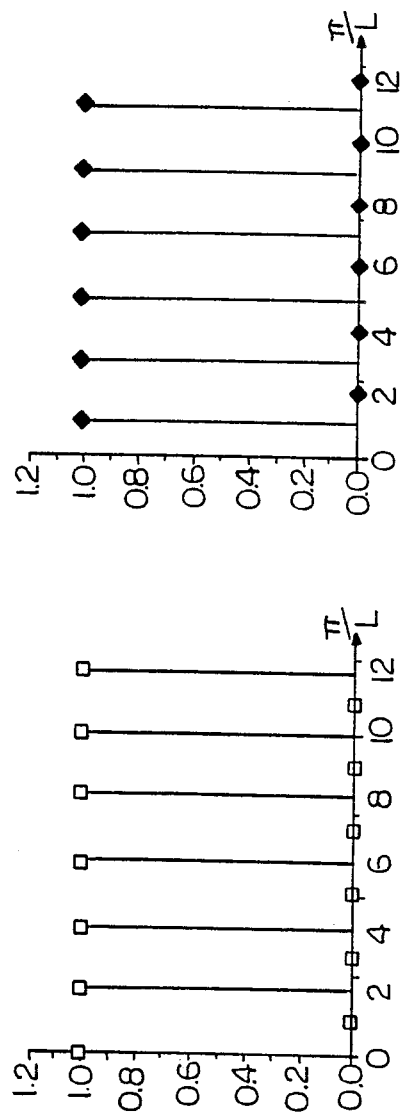

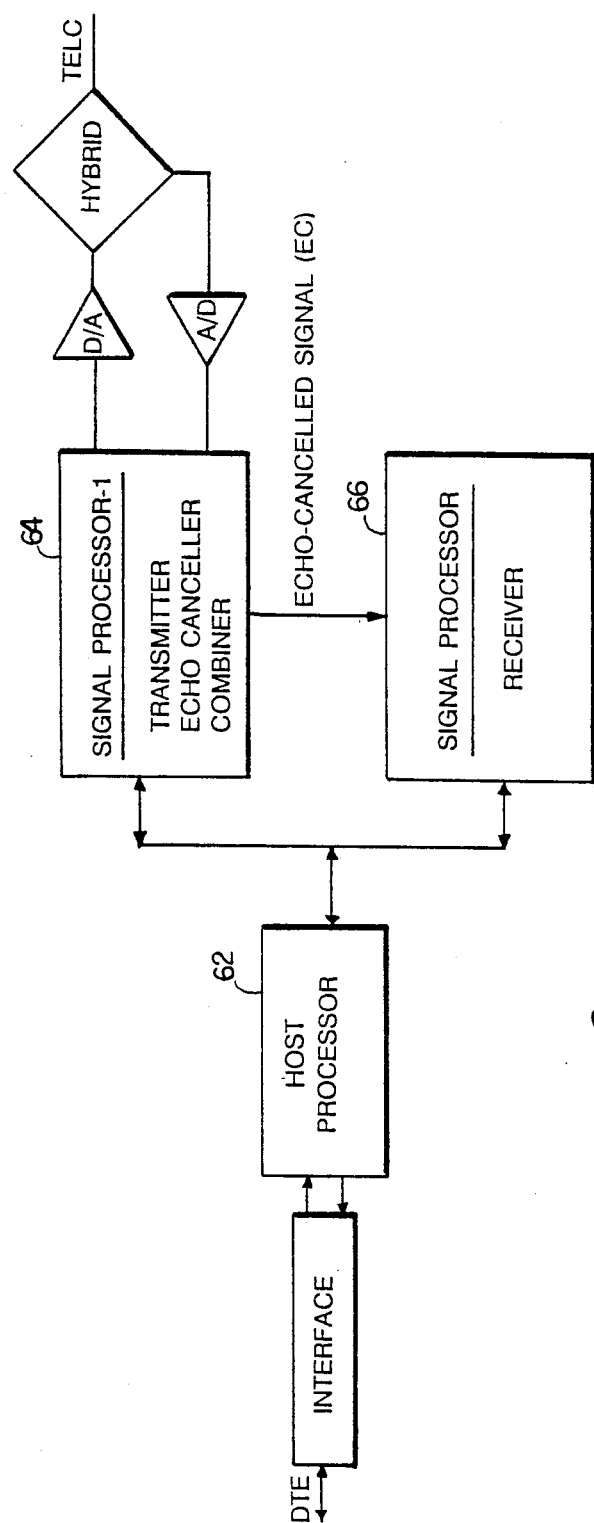

FAST TRAINING ECHO CANCELLER

BACKGROUND OF THE INVENTION

This invention relates to data communication equipment or modems.

Data communication equipment (DCEs), or modems, are devices used to transmit and receive binary data over a communication channel. One category of DCEs, sometimes referred to as full-duplex modems, is capable of performing the functions of transmitting and receiving simultaneously. When the modem is transmitting and receiving simultaneously over a two-wire communication link (e.g., transmission over the switched telephone network), an echo of the transmitted signal is commonly present in the signal received from the remote modem. If the transmitted and received signals occupy the same frequency band, it is necessary to remove the echo signal, in order to reliably detect the data sent by the remote modem.

The echo signal typically has a near echo and a far echo component. The near echo is generated by the imperfect hybrid couplers in the local modem and the near-end telephone central office. The far echo, on the other hand, is mainly generated by the hybrid couplers in the remote central office and the remote modem. The far echo is delayed in time relative to the near echo. When this delay can be substantial, the echo canceller is often broken into a near-echo and a far-echo canceller component which are also separated by a delay.

High-speed modems typically use bandwidth-efficient modulation schemes such as quadrature modulation. In such systems, the binary data is first mapped into a sequence of complex signal points (symbols) chosen from a constellation with a finite number of points. The real-valued transmitted signal carries information about this complex sequence.

Two-wire, full-duplex, high-speed modems, such as the standard V.32 voiceband modem specified by the CCITT, come equipped with adaptive echo cancellers which are capable of nearly eliminating the echoes of the transmitted signal. An echo canceller is typically implemented as a transversal filter which consists of a tapped-delay line, and a series of variable complex-valued tap coefficients. The inputs to the tapped-delay line are the aforementioned complex signal points. These are appropriately weighted by the tap coefficients to generate as output the real part of the weighted running sum. This represents an approximation of the received real-valued echo signal. The echoes are cancelled by subtracting this estimated echo signal from the real received signal.

Echo cancellers which are implemented as a transversal filter with a complex-input and a real output are often referred to as Nyquist echo cancellers. Nyquist echo cancellers often consist of a near canceller and a far echo canceller. One realization of Nyquist echo cancellers is described by S. Weinstein in the U.S. Pat. No. 4,131,767 (reissue Re31,253).

An echo canceller is typically trained in the absence of the remote signal, during an initialization or training period which occurs prior to data transmission. In many echo cancellers, the transversal filter is trained using the least mean-square (LMS) algorithm. In an LMS algorithm the tap coefficients are continually adjusted to remove any correlation between the complex input symbols and the residual received signal which remains after echo cancellation. However, the time required to accurately train an echo canceller in this manner can be very long, particularly in modems which employ echo cancellers with long transversal filters 10. In the past, fast training methods have been discussed for echo cancellers whose input and output are either both real or both complex-valued. One method using an ordinary periodic chirp sequence was disclosed by T. Kamitake in IEEE Proc. of ICC'84 (pp. 360–364, May 1984, Amsterdam, Holland) in a paper entitled "Fast Start-up of an Echo Canceller in a 2-wire Full-duplex Modem". A similar method using a pseudo-random shift-register sequence was later described by V. Kanchan and E. Gibson in IEEE Trans. on ASSP (Vol. ASSP-86, No. 7, pp. 1008–1010, Jul. 1988) in a paper entitled "Measurement of Echo Path Response". These methods are not applicable to Nyquist echo cancellers with a complex input and a real output.

In IEEE Proc. of GLOBECOM'87 (pp. 1950–1954, Nov. 1987, Tokyo, Japan), J. M. Cioffi proposed a method for fast simultaneous training of both the near and the far echo cancellers of a Nyquist echo canceller in a paper entitled "A Fast Echo Canceller Initialization Method for the CCITT V.32 Modem." This method is based on the discrete Fourier transform (DFT) and uses a real periodic pseudo-noise sequence, however, it assumes a perfect Hilbert filter (transformer) in the transmitter which is generally not realizable.

When the echo path can be substantially modeled as a linear filter, a transversal filter can effectively reconstruct and substantially cancel the echo signal. However, in certain instances, the far echo may also contain a small amount of frequency offset, also referred to as phase roll, which complicates echo cancellation. Some more sophisticated echo cancellers also include phase-roll compensation circuitry which can track the phase variations in the far echo and thereby remove its detrimental effect. Typically, the phase-roll compensation circuitry includes a phase-locked loop (PLL) to acquire the phase-roll frequency and phase during the training period.

SUMMARY OF THE INVENTION

In general, in one aspect, the invention features a modem for communicating with a remote device in both directions over a channel. The modem includes a transmitter for transmitting information over a channel, a receiver for receiving a signal on the channel possibly including a real echo signal; an echo canceller for estimating the real echo signal, the echo canceller module having variable coefficients; and a trainer module for applying a complex training signal sequence to the transmitter and for computing the variable coefficients based upon correlations between the complex training signal sequence and the corresponding real echo signal.

Preferred embodiments include the following features. The complex training sequence is periodic and has the properties that the real and imaginary parts of the sequence are orthogonal to each other; the autocorrelation of the real part is a first impulse train and the autocorrelation of the imaginary part is a second impulse train. Also, the complex training sequence, the first impulse train, and the second impulse train are all periodic with periods equal to integer multiples of an integer variable L.

In general, in another aspect, the invention is a modem of the type wherein the echo signal includes a near echo having a span of about $N_1$ and a far echo having a span of about $N_2$, the near echo and the far echo being separated by a delay, B, and wherein the training sequence is a periodic sequence having a period equal to an integer multiple of a variable L and the modem further includes a computational element for determining the value of the variable L by: selecting an integer k which is no larger than $(B-N_1)/(N_1+N_2)$; and setting L equal to an integer existing in an interval R which is substantially defined as follows: $[(B+N_2)/(k+1)] \leq R \leq [(B-N_1)/k]$.

In general, in yet another aspect, the invention is a modem of the type wherein the far echo may have a phase roll, the operation of the echo canceller module is controlled by specifying an estimate of the phase roll frequency and the computed correlations are used to determine a set of echo canceller coefficients and the modem further includes a computational element for (1) computing the difference in phase between a first set and a second set of echo canceller coefficients, both sets having been generated by the trainer module, the first set of echo canceller coefficients corresponding to a time $T_1$ and the second set of echo canceller coefficients corresponding to a later time $T_2$; and (2) dividing the computed phase difference by the time difference, $T_2-T_1$, to arrive at the estimate of the phase roll frequency.

Preferred embodiments include the feature that the computed phase difference is a weighted average of the phase differences between corresponding elements of the first and second sets of echo canceller coefficients The invention directly estimates echo canceller coefficients without having to use a few thousand bauds of training time to iteratively approach the optimum values. Furthermore, the method for computing the echo canceller coefficients is accurate and computationally efficient as compared to other methods of computing such coefficients. In addition, the period of time during which echo response data must be gathered for the computations can generally be reduced to a period which is significantly less than the total echo delay of the channel. Consequently, the invention yields very fast echo canceller training, significantly faster than is achievable in previous modems.

The invention offers the additional advantage of producing echo canceller coefficients which are very close to their optimal values and which may result in a residual echo which is within 2 db of its optimal value. Thus, further training using alternative methods such as a least-mean-squares (LMS) algorithm may not be necessary.

The invention can be used for estimating the complex transfer function of a linear system when only the real output of the system is available.

Other advantages and features will become apparent from the following description of the preferred embodiment, and from the claims.

DESCRIPTION OF THE PREFERRED EMBODIMENT

We first briefly describe the drawings.

FIG. 2 depicts the autocorrelation properties of a complex periodic training sequence which is used to train the echo canceller shown in FIG. 1;

FIG. 3 depicts the power spectrum of the complex periodic sequence which has the autocorrelation properties shown in FIG. 2;

Figure 1:
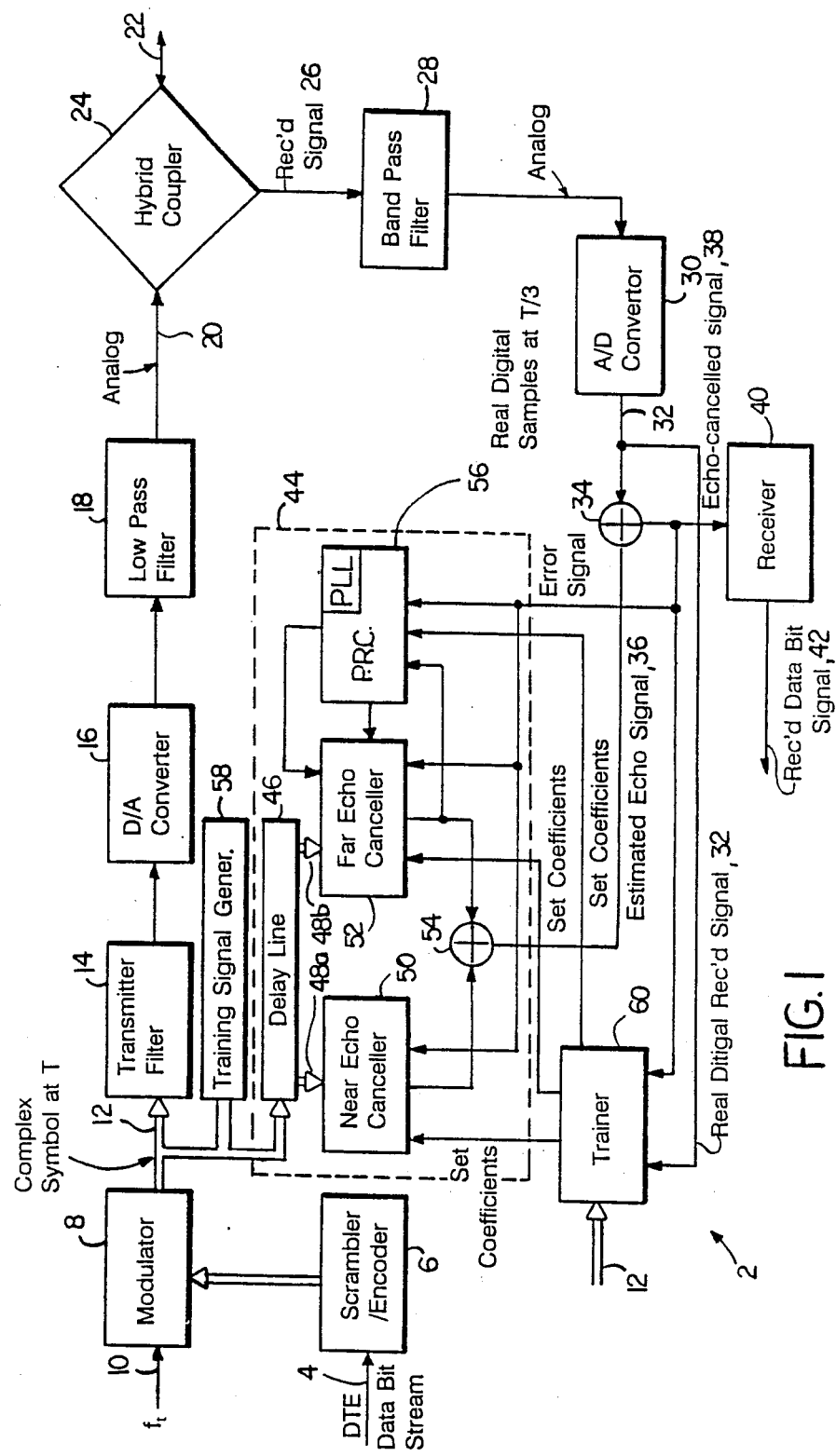
FIG. 1 is a block diagram of an echo cancellation modem.
Figure 5:
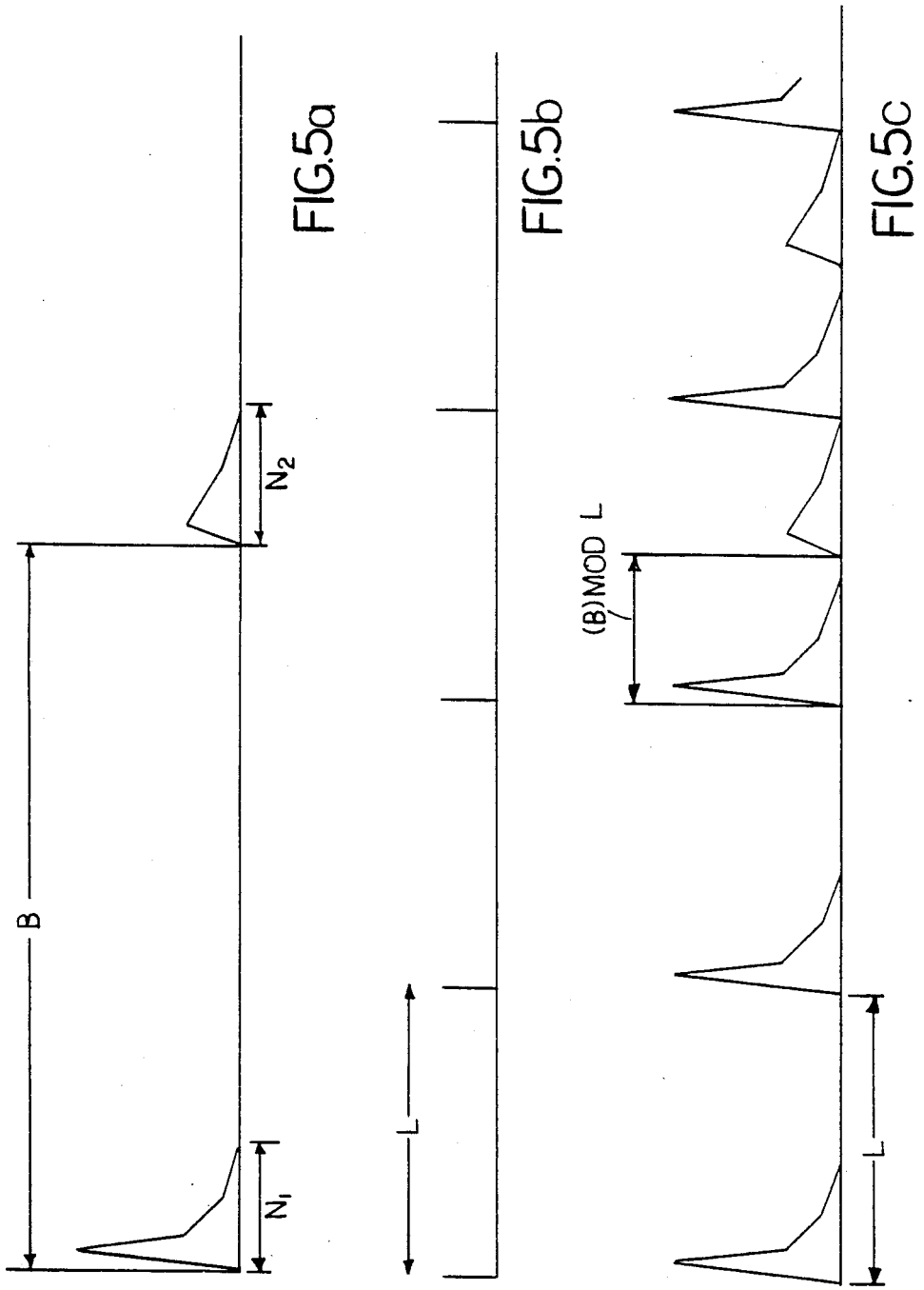
Figure 6:
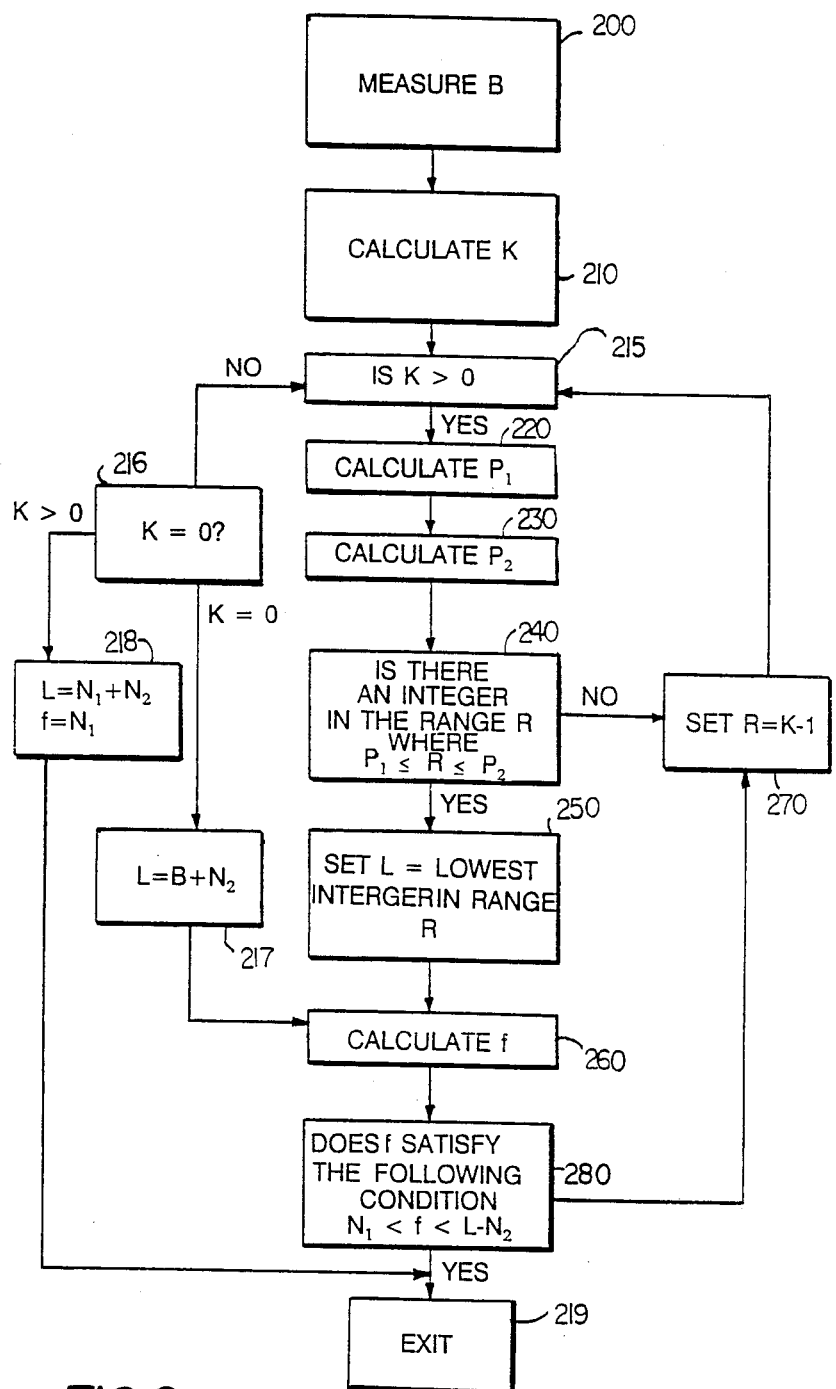
Figure 7:
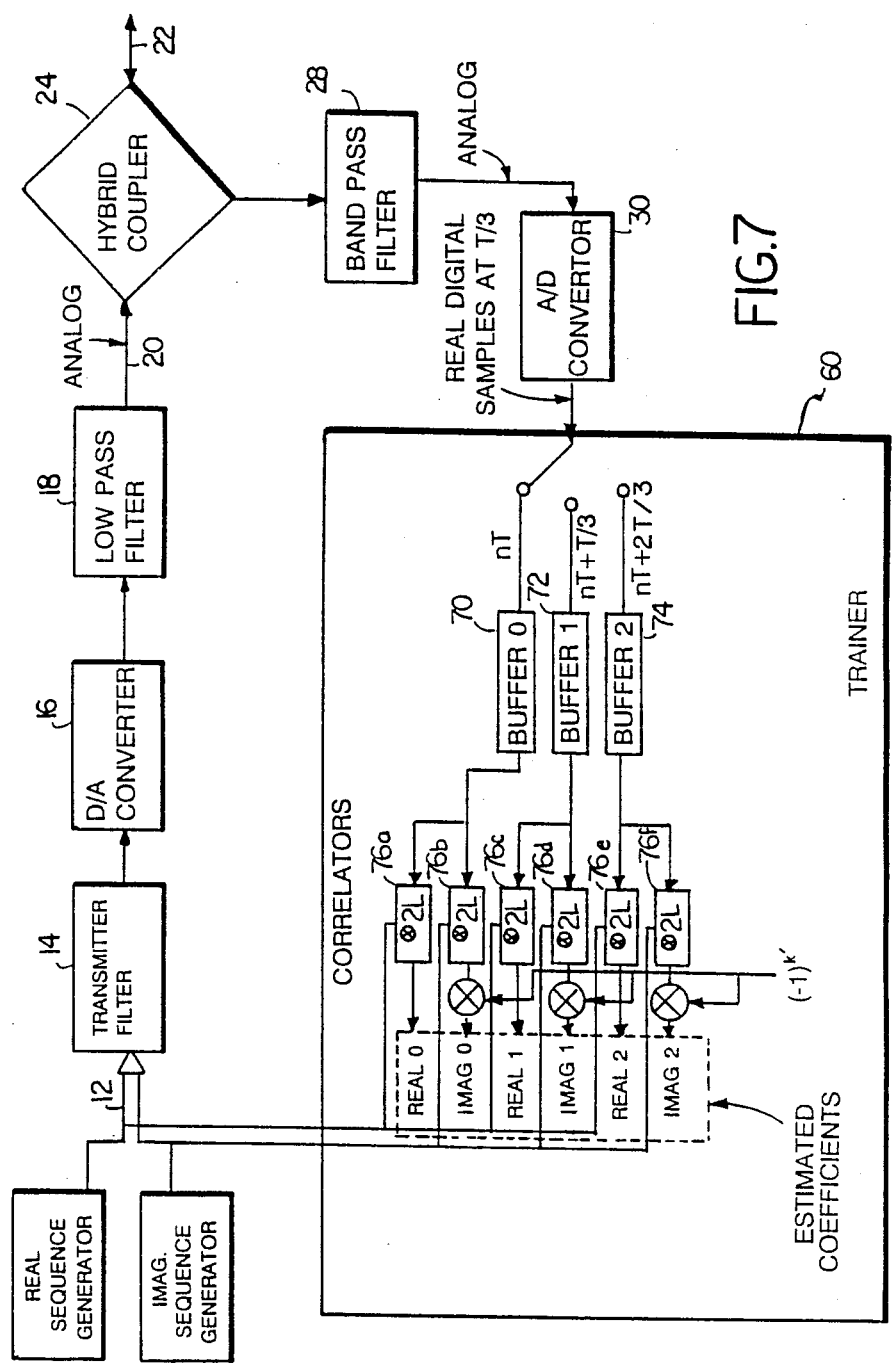
Figure 8:
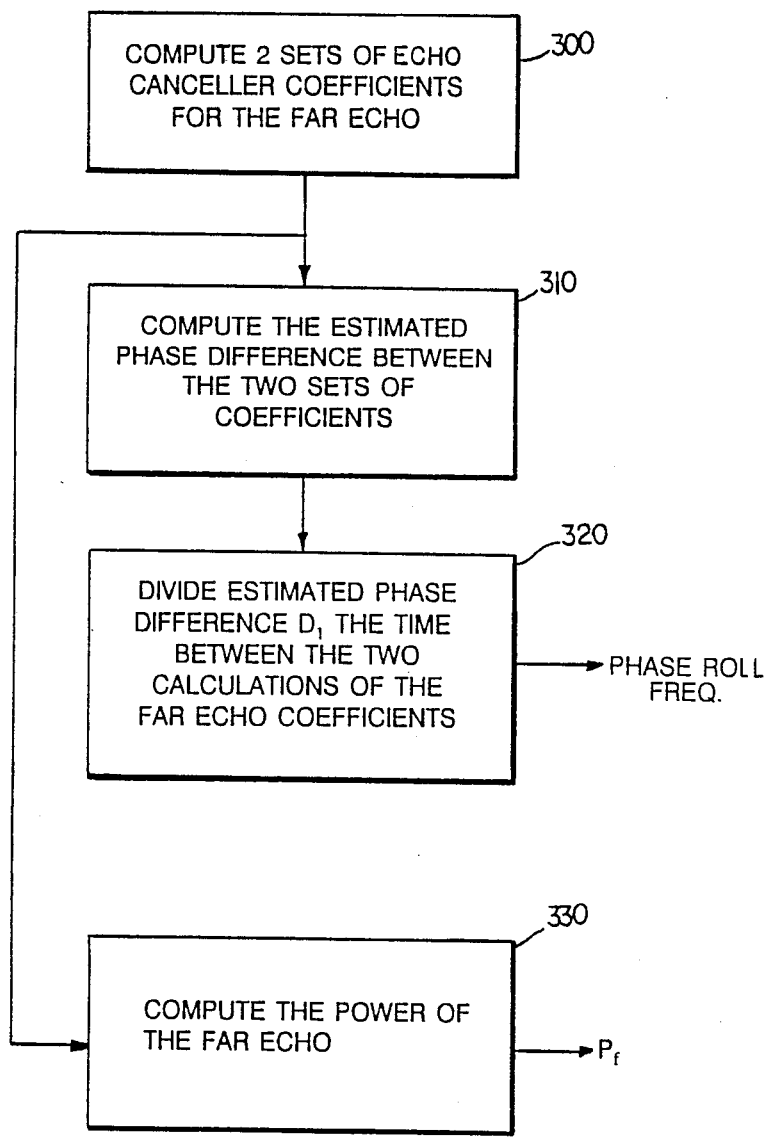

FIGS. 5a–c depict the echo response of a representative channel over which the modem shown in FIG. 1 communicates;

FIG. 6 is a flow chart of another algorithm for determining the period of the complex periodic training sequence;

FIG. 7 is a block diagram of a portion of the echo cancellation modem, depicted in FIG. 1, depicting details of the trainer;

FIG. 8 is a flow chart of an algorithm for determining the phase roll frequency and the power of the far echo; and FIG. 9 is a high level block diagram of a modem which embodies the invention.

STRUCTURE AND OPERATION

Referring to FIG. 1, in an echo cancellation modem 2, which may be of a Nyquist echo canceller type, a scrambler/encoder 6 receives a data bit stream over an input line 4. The scrambler/encoder 6 randomizes the data bits to ensure that any bit pattern is as likely to occur as any other bit pattern and it encodes the bits according to the coding system being used to generate a first sequence of complex symbols. A modulator 8, using a carrier signal 10 of frequency $f_c$, modulates the output of the scrambler/encoder 6 to generate a digital transmit signal 12 consisting of a second sequence of complex symbols. Next, a transmitter filter 14, a digital-to-analog converter 16 and a low pass filter 18 convert the digital transmit signal to an analog signal 20 which is ready for transmission over a channel 22 to a remote device, not shown. A hybrid coupler 24 couples the analog signal 20 to the channel 22.

The hybrid coupler 24 also accepts signals sent over the channel 22 to the modem 2 by the remote device and sends them to a receiver portion of the modem 2 as a received signal 26. During full-duplex communication over the channel 22, the received signal 26 includes both a near echo and a far echo, which may have an associated phase roll. A band pass filter 28 processes the received signal 26 and an analog-to-digital converter 30 converts it to a real digital received signal 32. The analog-to-digital converter 30 produces samples at times kT/M, where T is the baud interval of the local modem's transmitter, M is an integer chosen such that no aliasing will occur in the received signal after sampling, and k is a sampling interval index. (In the embodiment described herein, M is chosen to be equal to 3. A combiner 34 combines the samples of the real digital received signal 32 with corresponding samples of an estimated echo signal 36 to generate an echo-cancelled signal 38. Finally, a receiver 40 processes the echo-cancelled signal 38 to produce a received data bit stream 42 corresponding to the bit stream sent by the remote device.

An echo canceller module 44 within the modem 2 generates the estimated echo signal 36. In the echo canceller module 44, a delay line 46 receives the complex transmit signal 12 and produces two groups of signals 48a–b which are separated in time from each other by a bulk delay. The group 48a corresponds to the near echo signal and includes a plurality of complex symbols each of which are delayed in time relative to each other so that they span the near echo signal; whereas the group 48b corresponds to the far echo signal and includes a plurality of other complex symbols each of which are delayed in time relative to each other so that they span the far echo signal. The group of delayed complex symbols 48a, corresponding to shorter periods of delay, are processed by a near echo canceller 50 and the group of delayed complex symbols 48b, corresponding to longer periods of delay, are processed by a far echo canceller 52. Both the near echo canceller 50 and the far echo canceller 52 include variable coefficients which are trained so that the echo cancellers 50 and 52 produce outputs which are accurate estimates of the near echo and the far echo, respectively. A summer 54 combines the outputs of the near echo canceller 50 and the far echo canceller 52 to generate the estimated echo signal 36.

The echo canceller module 44 also includes a phase roll compensator (PRC) 56 which controls the far echo canceller 52. After being trained, the PRC 56 introduces a phase roll into the output of the far echo canceller 52 which approximates the phase roll of the far echo in the received signal 26.

Training of the variable coefficients of the echo canceller module 44 is controlled by a training signal generator 58 and a trainer 60. During training, which may occur prior to data communication or during a period interrupting data communication, the training signal generator 58 generates a special echo training sequence that is sent to the remote device and the trainer 60 monitors the resulting real digital received signal 32. The remote device remains silent during this period of echo training, thus, the resulting real digital received signal 32 basically consists only of near and far echoes. Based upon the monitored echo signal, the trainer 60 computes echo canceller coefficients which set the variable coefficients in the near echo canceller 50, the far echo canceller 52 and the PRC 56 so that the echo canceller 44 generates an estimated echo signal 36 closely approximating the monitored echo. The echo canceller module 44 uses the echo-cancelled signal 38 as an error signal indicating how accurately the echo canceller module 44 has estimated the echo using the coefficients estimated by the trainer 60. Further fine adjustment of the echo canceller coefficients may be incorporated using the echo-cancelled signal 38 and the well known least-mean-square (LMS) adaptive algorithm.

The training generator 58 generates a complex periodic sequence, $p(n) = p_r(n) + jp_i(n)$, having a period of 2L and the following autocorrelation properties:

$$p_r(n) \otimes_{2L} p_r(n) = \qquad (1)$$

$$\sum_{k=0}^{2L-1} p_r(k) \times p_r(n+k)_{Mod\ 2L} = \begin{cases} A & (n)_{Mod\ 2L} = 0, L \\ 0 & \text{elsewhere} \end{cases}$$

$$p_i(n) \otimes_{2L} p_i(n) = \qquad (2)$$

$$\sum_{k=0}^{2L-1} p_i(k) \times p_i(n+k)_{Mod\ 2L} = \begin{cases} A & (n)_{Mod\ 2L} = 0 \\ -A & (n)_{Mod\ 2L} = L \\ 0 & \text{elsewhere} \end{cases}$$

$$p_r(n) \otimes_{2L} p_i(n) = \sum_{k=0}^{2L-1} p_r(k) \times p_i(n+k)_{Mod\ 2L} = 0 \text{ for all } n. \qquad (3)$$

where:
$k$ is an integer delay index;
$n$ is the time index;
$L$ is the one half of the period of the periodic sequence;
$\otimes_{2L}$ denotes the circular correlation operation of length 2L;
$A$ is a positive real number: and $()_{MOD\ 2L}$ means the modulo 2L operation required by the circular correlation.

As indicated the real and imaginary parts of the training sequence are orthogonal, i.e., the cross-correlation of length 2L between $p_r(n)$ and $p_i(n)$ is zero for all n. The properties of the autocorrelation of the real and imaginary parts of p(n) are illustrated in FIG. 2. And the corresponding power spectrum of such a training sequence has the form illustrated in FIG. 3. Note that the power spectrum of $p_r(n)$ and $p_i(n)$ are the 2L-point discrete Fourier transforms of the correlations given by Eqs. (1) and (2), above.

Using a training sequence having the above characteristics, the trainer 60 calculates the echo canceller coefficients for the near echo and the far echo cancellers 50 and 52 by computing correlations between a period of the complex training sequence 12 and the real digital received signal 32. To appreciate that the computed correlations yield the desired values for the echo canceller coefficients, it is useful to review the mathematics describing the operation of the system.

The echo channel can be considered as a linear system with a complex impulse response c(t). If the transmitted data symbols are denoted as d(nT), where T is the baud time interval and n is the baud interval index, then the output of the system sampled at every T, y(nT), is related to the input, d(nT) as follows:

$$y(nT) = \text{Re}[c(nT) \odot d(nT)] \qquad (4)$$

where $\odot$ denotes the linear convolution operation. In this example, y(nT) represents the real sampled digital received signal 32. Actually, if the received signal 26 is sampled at a rate 3/T, as it is in the above-described embodiment, then the output signal y(t) may be written as y(nT+mT/3), where m=0,1,2. This can be more simply denoted as $y_m(n)$. Using the same convention, $c(nT+mT/3)$ can be rewritten as $c_m(n)$ which is the impulse response of the echo channel sampled at nT+mT/3 and equation (4) becomes $$Y_m(n) = \text{Re}[c_m(n) \odot d(n)] \qquad (5)$$

Substituting the complex training sequence p(n) for d(n) results in the following:

$$Y_m(n) = \text{Re}[c_m(n) \odot p(n)] \qquad (6)$$

After the channel is fully excited by the training sequence p(n), the real echo $y_m(n)$ is also periodic with a period of 2L, if the channel is time-invariant, and then the correlation between the real echo and the sequence is:

$$Y_m(n) \otimes_{2L} p(n) = \text{Re}[c_m(n) \odot p(n)] \otimes_{2L} p(n) \qquad (7)$$

Separating $c_m(n)$ and p(n) into their real and imaginary parts yields:

$$Y_m(n) \otimes_{2L} p(n) = [c_{mr}(n) \odot p_r(n) - c_{mi}(n) \otimes_{2L} [p_r(n) + jp_i(n)] \qquad (8)$$

where $c_{mr}(n)$ and $c_{mi}(n)$ are the real and imaginary parts of $c_m(n)$, respectively, and j is $\sqrt{-1}$. Since the real and imaginary parts of the chosen p(n) are orthogonal under the circular correlation of length 2L, the above equation reduces to:

$$Y_m(n) \otimes {}_{2L}p(n) = c_{mr}(n) \odot [p_r(n) \otimes {}_{2L}p_r(n)] - jc_{mi}(n) \odot [p_i(n) \otimes {}_{2L}p_i(n)] \quad (9)$$

$$y_m(n) \otimes {}_{2L}p(n) = c_{mr}((n)_{MOD\ 2L}) + c_{mr}((n-L)_{MOD\ 2L}) - jc_{mi}((n)_{MOD\ 2L}) + jc_{mi}((n-L)_{MOD\ 2L}) \quad (10)$$

$$y_m(n) \otimes {}_{2L}p(n) = c^*_m((n)_{MOD\ 2L}) + c_m((n-L)_{MOD\ 2L}) \quad (11)$$

where * denotes the complex conjugate operation. Because of the periodicity, only the correlation for $0 \leq n \leq 2L-1$ need be considered. From Eq. (11) it is apparent that the correlation results for $0 \leq n \leq 2L-1$ contain two duplicated (the first of which is complex conjugated) versions of $c_m(n)$, which have a span no greater than L. Hence, one of the versions provides enough information.

In general terms, the properties of the training sequence, as shown in FIGS. 2 and 3 and as specified in Eqs. 1-3, have the following significance. Note that the objective is to determine the impulse response of the echo channel which, of course, theoretically can be directly determined by stimulating the echo channel with an impulse. There is at least one problem, however, with using an impulse. Its energy is too concentrated in time and the impulse peak may drive the signal into nonlinear regions of the channel where the data signal does not normally operate during normal communications. By distributing the power evenly over time, as is implied by FIG. 3, one can transmit more energy with the training sequence and thus can more fully excite the channel without driving the transmitted signal into its nonlinear regions of operation. Moreover, by using a training sequence whose autocorrelation function is an impulse train, as shown in FIG. 2, one can still readily and directly determine the impulse response of the echo channel by simply correlating the training sequence with the echo response corresponding to the training sequence. That is, the resulting function, namely, $y_m(n) \otimes {}_{2L}p(n)$, corresponds to the echo channel response that one would obtain by stimulating the channel with the impulse train represented by the autocorrelation of p(n). The orthogonality property of the real and imaginary parts of the training sequence simply guarantees that the real and imaginary parts do not interfere with each other, when the real and imaginary parts of the coefficients are estimated.

According to the correlation properties given by Eqs. (1) and (2), every half period of the correlation in Eq. (9) yields an estimate of the sampled echo channel response $c_m(n)$, if the total span of the echo is less than the half period L. Thus, it is verified that by using the periodic sequence characterized by Eqs. (1), (2) and (3), the real and imaginary parts of $c_m(n)$ can be obtained by simply performing circular correlation between a 2L-long segment of the samples of the real digital received signal 32 and the real and imaginary parts of one period of the periodic sequence p(n). There will be a sign difference between the imaginary parts of the estimated and the actual responses, if the correlation from the first half period is used. Since the real digital received signal is periodic, an alternative way to estimate the echo canceller coefficients $c_m(n)$ is to perform a linear correlation of length 2L between the real and imaginary parts of one period of the periodic sequence p(n) and a 3L-long segment of the real received signal 32.

For a Nyquist echo canceller with three subcancellers, the correlation processing is repeated for each incoming T/3 sample. Namely, Eq. (9) is repeated for m=0,1,2. Thus, there are three incoming samples per baud and three subcanceller coefficients are obtained per baud interval.

A number of periodic sequences have the properties described in Eqs. (1) through (3). However, it is desirable that the sequence have a small peak-to-RMS (root-mean-square) ratio so that there is a lower risk of driving the transmitted signal into regions of nonlinear operation. A periodic sequence which has this desirable property is one for which the phase of its discrete fourier transform obeys a square law of frequency. Such a sequence is defined as follows (1) For $0 \leq n \leq L$, and if
   (a) L is even, then $$p_r(n) = \frac{1 + \cos\left(\left(n + \frac{L}{2}\right)\pi\right) + 2\sum_{k=1}^{\frac{L}{2}-1} \cos\left[\frac{2\pi(kn + k^2)}{L}\right]}{\sqrt{2L}} \quad (12)$$

$$p_i(n) = \frac{2\sum_{k=0}^{\frac{L}{2}-1} \cos\left[\frac{\pi((2k+1)n + 2k^2)}{L}\right]}{\sqrt{2L}} \quad (13)$$

(b) L is odd, then $$p_r(n) = \frac{1 + 2\sum_{k=1}^{\frac{L-1}{2}} \cos\left[2\pi\left(\frac{kn}{L} + \frac{k^2}{L+1}\right)\right]}{\sqrt{2L}} \quad (14)$$

$$p_i(n) = \frac{\cos\left[\left(n + \frac{L+1}{2}\right)\pi\right] + 2\sum_{k=1}^{\frac{L-1}{2}} \cos\left\{2\pi\left[\frac{(2k-1)n}{2L} + \frac{k^2}{L+1}\right]\right\}}{\sqrt{2L}} \quad (15)$$

(2) For $L \leq n \leq 2L$, then the second half of the sequence is the complex conjugate of the first half of the sequence, namely:

$$p_r(n) = p_r(n-L), \text{ and} \quad (16)$$

$$p_i(n) = -p_i(n-L) \quad (17)$$

Another sequence which has a slightly higher peak-to-RMS ratio but is easier to compute in real time since fewer cosine values are required is:

(1) For $0 \leq n \leq L$, $$p_r(n) = \frac{1 + \cos\left(\left(n + \frac{L}{2}\right)\pi\right) + 2\sum_{k=1}^{INT\left[\frac{L-1}{2}\right]} \cos\left[\frac{2\pi(kn + k^2)}{L}\right]}{\sqrt{2L}} \quad (18)$$

$$p_r(n) = \frac{\cos\left[\left(n + \frac{L+1}{2}\right)\pi\right] + 2\sum_{k=1}^{INT\left[\frac{L-1}{2}\right]} \cos\left\{2\pi\left[\frac{(2k + (-1)^L)n}{2L} + \frac{k^2}{L}\right]\right\}}{\sqrt{2L}} \quad (19)$$

(2) For $L \leq n \leq 2L$, $$p_r(n) = p_r(n-L), \text{ and} \quad (20)$$

$$p_r(n) = -p_r(n-L) \quad (21)$$

where $INT[(L-1)/2]$ is the largest integer which is less than or equal to $[(L-1)/2]$.

Figure 4:
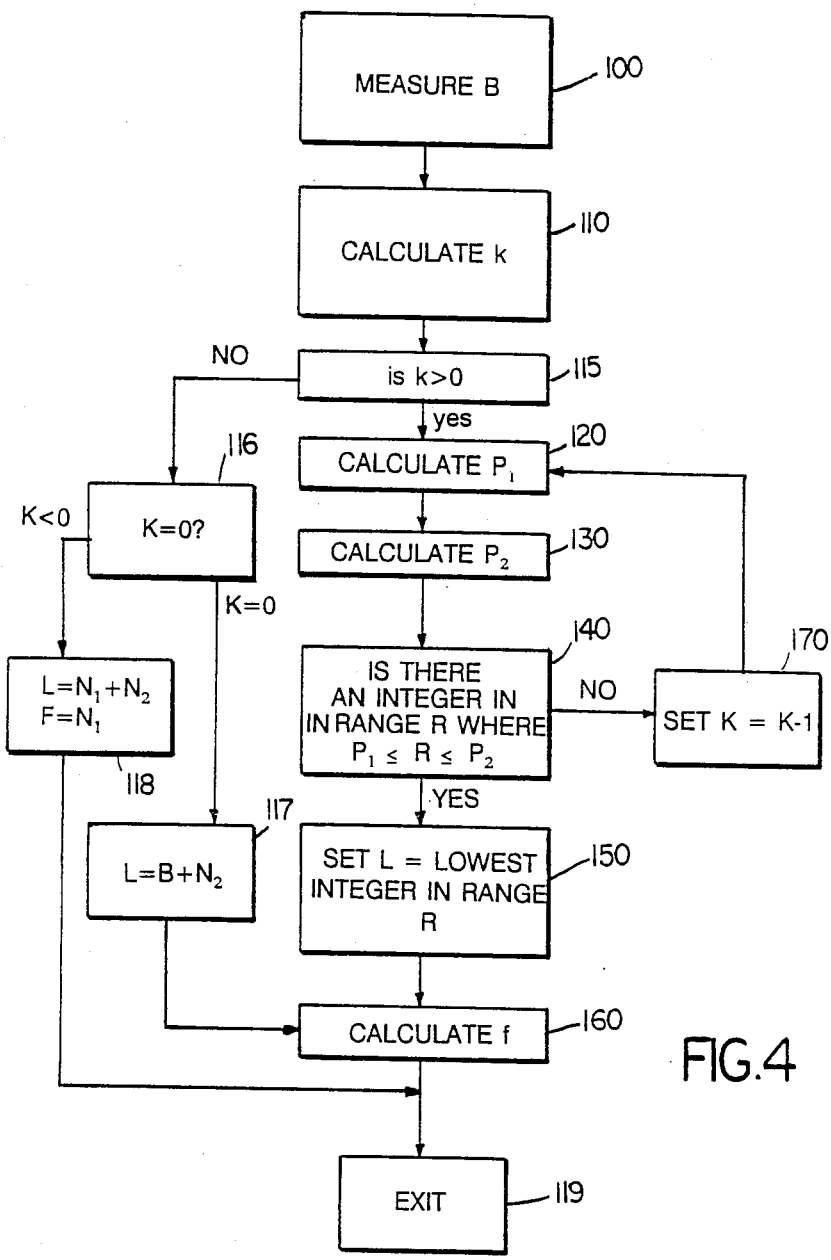
FIG. 4 is a flow chart of an algorithm for determining the period of the complex periodic training sequence.

Modem 2 implements the algorithm illustrated in FIG. 4 to determine the value of L. The algorithm determines the period which must be used in constructing the periodic sequence so that the training sequence produces interleaved, non-overlapping near and far echoes when the channel is fully excited. What this means can be more clearly understood with the aid of FIGS. 5a–c.

FIG. 5a shows the echo response of the channel to a single impulse at $t=0$. The near echo occurs first, followed by the far echo delayed in time by B. Note that the span of the near echo and span of the far echo is less than or equal to $N_1$ and $N_2$, respectively. When the channel is excited by the impulse train shown in FIG. 5b, the echo response is as shown in FIG. 5c. Until the far echo appears, the echo response consists of a train of near echoes, one occurring every L baud. After B bauds have elapsed, the channel becomes fully excited and the far echoes begin to appear, also separated by a period of L. To utilize the near and far echoes thus generated for computing the echo canceller coefficients, it is desirable that the near and far echoes are non-overlapping as shown in FIG. 5c. In addition, it is desirable that the total time period, L, over which the two echoes occur should be as short as possible so that the computations involve the minimum number of bauds. The algorithm shown in FIG. 4 selects the L which satisfies these two criteria.

During the period of echo canceller training but prior to transmitting the special echo training sequence, the modem measures the far echo round trip delay, B, introduced by the channel 22 (step 100, FIG. 4). The delay, B, is equal to the length of time required for the far echo to come back after the training signal is transmitted One such method for determining the far echo delay is described in the CCITT V.32 standard.

Note that $N_1$ and $N_2$ are usually determined at the time of designing the modem. Generally, they are empirically determined by studying the typical characteristics of channels. It is preferable to select $N_1$ and $N_2$ so that they are upper bounds on the duration of the corresponding echoes which one expects to receive.

After modem 2 has measured the far echo delay, B, it computes a variable, k, which is defined as follows:

$$k = INT[(B-N_1)/(N_1+N_2)] \quad \text{(step 110)}$$

where $INT[x]$ means the largest integer that is less than or equal to x.

Next, modem 2 tests k to determine whether it is greater than zero (step 115). If k is greater than zero, the modem computes two additional variables, $p_1$ and $p_2$, defined as follows:

$$p_1 = (B+N_2)/(k+1) \quad \text{(step 120)}$$

$$p_2 = (B-N_1)/k \quad \text{(step 130)}$$

Then, in step 140, modem 2 determines whether an integer exists in the range R defined as follows:

$$p_1 \leq R \leq p_2$$

If there is an integer within the range R, modem 2 sets L equal to the smallest integer within the range (step 150). That is, if $p_1$ is an integer, then $L=p_1$; otherwise, $L=INT[p_1+1]$. The modem then branches to step 160 where it computes f, defined as follows:

$$f = B - kL$$

The variable f indicates the location of the far echo within the period L. The far echo is located between f and $f+N_2-1$. Using this information, modem 2 assigns the correlation calculations for each baud in the interval of length L to the corresponding component of the echo.

In step 140, if there is no integer within the range R, then modem 2 branches to step 170 where it decrements k by one and then returns to step 120. Steps 120 through 140 are repeated until the range R includes an integer.

If in step 115 k is not greater than zero, then modem 2 tests if k equals zero (step 116). If k equals zero, modem 2 sets L equal to $B+N_2$ and then branches to step 160 to compute f. However, if k is less than zero, then modem 2 sets L equal to $N_1+N_2$, sets f equal to $N^1$ (step 118) and then exits the algorithm (step 119).

The algorithm yields an L which lies within the following interval:

$$N_1+N_2 \leq L \leq 2(N_1+N_2)-1,$$

for any practical values of $N_1$, $N_2$, and B.

For finite precision implementations of the algorithm, the selected value for L may be incorrect or non-optimal. If L is incorrect, the near and far echoed may overlap. Whereas, if L is non-optimal, the obtained period is not the smallest possible period. These errors are due to round-off error effects. The critical stages of the algorithm are in step 140, where the range R is tested for the presence of integers, and in step 110, where the initial value of k is computed. To avoid the problems associated with round-off errors, the algorithm may be modified as shown in FIG. 6.

Steps 200 and 215 correspond to steps 100 and 115, respectively, of FIG. 4. Step 210 is slightly different from step 110, namely, $k=INT[(B-N_1)/(N_1+N_2)+\delta_0]$ where $\delta_0$ is a small positive correction number. In step 215 if k is greater than zero, modem 2 computes $p_1$ (step 220) and $p_2$ (step 230) which are defined differently from what was described above. Namely, $$p_1 = (B+N_2)/(k+1)+\delta_1 \quad \text{(step 220)}$$

$$p_2 = (B-N_1)/k+\delta_1 \quad \text{(step 230)}$$

where $\delta_1$ is a small correction number.

Then, in step 240, modem 2 determines whether an integer exists in the range R as previously defined, i.e.:

$$p_1 \leq R \leq p_2$$

For this test, however, $p_1$ is treated as an integer if its fractional part is less than a threshold $\delta_2$.

As before, if there is an integer within the range R, modem 2 sets L equal to the smallest integer within the range (step 250). That is, if $p_1$ is an integer, then $L=p_1$; otherwise, $L=INT[p_1]+1$. The modem then branches to step 260 where it computes f, as previously defined, i.e.:

$$f = B - kL$$

Finally, modem 2 determines if $N_1 \leq f < L - N_2$ (step 280). If it is, the algorithm stops (step 219).

If an integer does not exist within the range (step 240) or if f does not lie within the defined interval (step 280), modem 2 branches to step 270 where it decrements k by one. Then, it branches back to step 215 to repeat the steps until an L which satisfies the conditions of the algorithm is found.

In step 215, if k is not greater than zero, modem 2 branches to step 216 which corresponds to step 116 of the algorithm shown in FIG. 4. Indeed, the sequence followed after branching to step 216 is the same as that described for FIG. 4. That is, modem 2 implements steps 217 and 218 which are the same as steps 117 and 118, respectively, in FIG. 4.

The correction numbers, $\delta_0$ and $\delta_1$, and the threshold, $\delta_2$, depend upon the word length and the rounding scheme used in the computations. It is preferable that the word length used in computation should be long enough For example, when 16 bit fixed-point arithmetic is used, double precision computations are preferable. In this case, experiments have determined that when $\delta_0=2^{-15}$, $\delta_1=2^{-14}$ and $\alpha_2=2^{-12}$, then the algorithm computes a correct L and step 280 may not be necessary.

The initial values of the coefficients of the near and far echo cancellers are computed as follows. The required half-period L of the special training sequence is computed based on the value of B as described above. The trainer 60 then computes, in real time, the required periodic complex training sequence according to the value of L. The computed training complex sequence is then transmitted by the transmitter for at least $k'+4$ half-periods, or $(k'+4)L$ bauds, where $k'=k$ if $k>0$ or $k'=0$ otherwise, and k is obtained during the determination of L. After at least $k'+1$ half-periods, or $(k'+1)L$ bauds, of the training sequence have been transmitted, the trainer 60 stores the real received digital signal samples 32 in 3 buffers 70, 72 and 74, shown in FIG. 7, which are T-spaced delay lines that are each at least 2L samples long. Another 2L bauds later, after each buffer has received 2L samples, and while the transmitter continues sending the periodic sequence, trainer 60, using correlators 76a–f, starts to perform correlations of the input samples with the real and imaginary parts of one period of the periodic training sequence The correlations can either be circular correlations if the same samples in the 2L long buffers 70, 72 and 74 are being used, or they can be linear correlations if first-in-first-out (FIFO) buffers that receive 3 new samples per baud are employed instead. The real coefficients are directly obtained from the correlation results, while the imaginary part of the coefficients are equal to the correlation results multiplied by $(-1)^{k'}$. Assuming three complex coefficients, one for each subcanceller, are computed per baud, a time period of $N_1$ bauds will be used to compute all the coefficients of the near echo canceller 50 (see FIG. 1). The coefficients of the far echo canceller 52 are computed in the same way as computing the near canceller coefficients. The coefficients of the far canceller 52 can be computed in $N_2$ bauds.

The modem uses the calculated far echo canceller coefficients to set the variable coefficients of PRC 56. PRC 56 may employ digital phase-locked loop (PLL) technology such as that described in U.S. Pat. No. 4,813,073 entitled "Echo Cancellation", issued on Mar. 14, 1989, and incorporated herein by reference. To train the PLL in PRC 56, it is necessary to accurately estimate the phase-roll frequency and to measure the far echo power. Modem 2 implements the algorithm illustrated in FIG. 8 to compute both of these characteristics.

Assuming that the frequency of the far echo phase-roll is $\omega_p$ radians/s, the far echo is modulated by $\exp[j\omega_p t]$. The far echo received at time $T_1$ will have a phase-rotation $\omega_p T_1$ radians relative to the far echo without phase-roll. If the frequency $\omega_p$ is relatively low, such that in a 2L long segment, all the received signal samples have approximately the same phase rotation, the correlation property between the training sequence and the received signal described above will approximately still hold. An estimated far canceller coefficient using the received signal at the time $T_1$ will be equal to the coefficient estimated without phase-roll multiplied by $\exp[j\omega_p T_1]$. Similarly, the same far echo canceller coefficient estimated at a later time $T_2$ is multiplied by $\exp[j\omega_p T_2]$. Thus, the phase-roll frequency $\omega_p$ can be estimated by dividing the angle difference, $\Phi=(T_2-T_1)\omega_p$, between these two far echo canceller coefficients by the time difference $T_2-T_1$. The estimation procedure is described below.

First, modem 2 computes at least two sets of far echo canceller coefficients using the correlation technique described above (step 300). A first set of coefficients is computed corresponding to time $T_1$ and a second set of coefficients is computed corresponding to time $T_2$, which occurs D baud after time $T_1$. In practice, it is convenient to choose $D=L$, although D can be another positive integer value. Then, in step 310, modem 2 computes the estimated phase difference between the two sets of calculated far echo canceller coefficients.

One way of determining the estimated phase difference is by computing the sine of the phase difference, $\phi_{m,n}$, between each of the corresponding coefficients in the two sets of calculated far echo canceller coefficients.

Sin $\phi_{m,n}$ is related to the calculated coefficients in the following way:

$$\sin \phi_{m,n} = \frac{Im[c_m(n+D)]Re[c_m(n)] - Im[c_m(n)]Re[c_m(n+D)]}{|c_m(n)| \, |c_m(n+D)|}$$

This is approximated as follows:

$$\sin \phi_{m,n} \approx \frac{c_{m,i}(n+D)c_{m,r}(n) - c_{m,i}(n)c_{m,r}(n+D)}{c_{m,i}^2(n) + c_{m,r}^2(n)}$$

where $c_{m,r}(n)$ and $c_{m,i}(n)$ are the real and imaginary parts of $c_m(n)$, $m=0,1,2$, respectively, $|c_m(n)|$ is the magnitude of $c_m(n)$ and it is assumed that the magnitudes of the two calculated coefficients are equal.

If the absolute value of the angle $\phi_{m,n}$ is small, e.g. less than 20 degrees, then $$\phi_{m,n} \approx \sin \phi_{m,n}.$$

Theoretically, the angle between any pair of far echo coefficients should be the same. However, noise and other interferences may undercut the validity of this relationship. Therefore, to reduce the effect of any noise or interference and improve the accuracy of the estimate of the phase roll frequency, the estimated angle may be averaged over all of the pairs of far echo coefficients. That is, in step 310 modem 2 may compute the following:

$$AVG(\phi) = \Sigma_{n,m} a_{m,n} \phi_{m,n}$$

where $\Sigma_{n,m} a_{m,n} = 1$, in order to assure that $AVG(\phi)$ is an unbiased estimate of the angle.

To obtain an optimal weight $a_{m,n}$, it is preferable to set $a_{m,n}$ equal to $c_{m,i}^2(n) + c_{m,r}^2(n) / \Sigma_{m,n}[c_{m,i}^2(n) + c_{m,r}^2(n)]$. When this is done, note that $AVG(\omega)$ equals:

$$\frac{\Sigma_{m,n}[c_{m,i}(n)c_{m,r}(n+D) - c_{m,i}(n)c_{m,r}(n+D)]}{\Sigma_{m,n}[c_{m,i}^2(n) + c_{m,r}^2(n)]}$$

It may be preferably to estimate the average angle by computing the just-cited equation rather than by computing the angle for each coefficient and then averaging all of the computed angles. The reason is that the former approach involves only one division; whereas the later approach involves many divisions. Since division is a time consuming and inefficient process when using commercially available digital signal processors, it is desirable to minimize the number of divisions.

After the estimated phase difference is computed, modem 2 computes an estimate of the average phase roll frequency by dividing $AVG(\phi)$ by $DT = T_2 - T_1$ (step 320).

Finally, in the step 330 modem 2 determines the power of the far echo by computing the following relationship:

$$P_f = \overline{\Sigma_i c_f(i) d(n-i)} = \overline{|E_f(n)|^2} = |d(n-i)|^2 \Sigma_i |c_f(i)|^2$$

where the overbar denotes the ensemble average operation and $d(n)$ is the data symbol which is transmitted.

The value of $P_f$ is then used for optimal scaling of the PLL coefficients in PRC 56.

The modem may be implemented by a multiple processor architecture, as shown in FIG. 9. That is, it has a general host processor 62, which performs overall control and data movement functions; a signal processing element 64, which performs the functions of the transmitter and echo canceller, including the implementation of the algorithms described above; and another signal processing element 66, which performs the functions of the receiver 40. A modem generally of this type is described in U.S. patent application Ser. No. 586,681 entitled Processor Interface Circuitry, to Qureshi et al. filed Mar. 6, 1984, incorporated herein by reference.

Other embodiments are within the following claims.

What is claimed is:

1. A modem for communicating with a remote device in both directions over a channel, the modem comprising:
   a. a transmitter for transmitting information over the channel;
   b. a receiver for receiving a signal on the channel possibly including a real echo signal;
   c. an echo canceller for estimating the real echo signal, the echo canceller module having variable coefficients; and
   d. a trainer module for applying a complex training signal sequence to the transmitter and for computing the variable coefficients based upon correlations between the complex training signal sequence and only the corresponding real echo signal.

2. A modem for communicating with a remote device in both directions over a channel, the modem comprising:
   a. a transmitter for transmitting information over the channel;
   b. a receiver for receiving a signal on the channel possibly including a real echo signal;
   c. an echo canceller for estimating the real echo signal, the echo canceller module having variable coefficients; and
   d. a trainer module for applying a complex training signal sequence to the transmitter and for computing the variable coefficients based upon correlations between the complex training signal sequence and the corresponding real echo signal, wherein said complex training sequence has the property that the real and imaginary parts of the sequence are orthogonal to each other so that their cross-correlation is equal to zero.

3. A modem as defined in claim 1 or 2 wherein the complex training sequence is periodic.

4. A modem as defined in claim 1 wherein the complex training sequence has the property that the real and imaginary parts of the sequence are orthogonal to each other.

5. A modem as defined in claim 1 or 2 wherein the complex training sequence has the properties that the autocorrelation of the real part is a first impulse train and the autocorrelation of the imaginary part is a second impulse train.

6. A modem as defined in claim 5 wherein the complex training sequence is periodic with a period of 2L, L being an integer, and of the first and the second impulse trains, one is periodic with a period of 2L, and the other is periodic with a period of L.

7. A modem as defined in claim 1 or 2 wherein the complex training sequence has a period of 2L, L being an integer, and said complex training sequence can be written in the form $p(n)=p_r(n)+jp_i(n)$, where $p_r(n)$ is the real part of the n-th complex signal point, $p_i(n)$ is the imaginary part of the n-th complex signal point, n is a time index and j is $-1$, $p(n)$ having the following auto-correlation properties:

$p_r(n) \otimes_{2L} p_r(n) =$ $$\sum_{k=0}^{2L-1} p_r(k) \times p_r((n+k)_{Mod\ 2L}) = \begin{cases} A & (n)_{Mod\ 2L} = 0, L \\ 0 & \text{elsewhere} \end{cases}$$

$p_i(n) \otimes_{2L} p_i(n) =$ $$\sum_{k=0}^{2L-1} p_i(k) \times p_i((n+k)_{Mod\ 2L}) = \begin{cases} A & (n)_{Mod\ 2L} = 0 \\ -A & (n)_{Mod\ 2L} = L \\ 0 & \text{elsewhere} \end{cases}$$

$p_r(n) \otimes_{2L} p_i(n) = \sum_{k=0}^{2L-1} p_r(k) \times p_i((n+k)_{Mod\ 2L}) = 0$ for all $n$.

where:
$\otimes_{2L}$ denotes a circular correlation operation, $A$ is a positive constant, and
$0_{MOD\ 2L}$ denotes a modulo $2L$ operation used by the circular correlation operation.

8. A modem as defined in claim 1 or 2 wherein the training sequence has a period of 2L, L being an integer, and said complex training sequence can be written in the form $p(n)=p_r(n)+jp_i(n)$, where $p_r(n)$ is the real part of the n-th complex signal point, $p_i(n)$ is the imaginary part of the n-th complex signal point, n is a time index and j is equal to $-1$, $p_r(n)$ and $p_i(n)$ having the following form:

a. for $0 \leq n < L$ and
  i. if L is even, then $p_r(n) =$ $$\frac{1 + \cos\left(\left(n + \frac{L}{2}\right)\pi\right) + 2\sum_{k=1}^{\frac{L}{2}-1} \cos\left[\frac{2\pi(kn + k^2)}{L}\right]}{\sqrt{2L}}$$

$$p_i(n) = \frac{2\sum_{k=0}^{\frac{L}{2}-1} \cos\left[\frac{\pi((2k+1)n + 2k^2)}{L}\right]}{\sqrt{2L}} \text{ and}$$

ii. if L is odd, then $$p_r(n) = \frac{1 + 2\sum_{k=1}^{\frac{L-1}{2}} \cos\left[2\pi\left(\frac{kn}{L} + \frac{k^2}{L+1}\right)\right]}{\sqrt{2L}}$$

$$p_i(n) = \frac{\cos\left[\left(n + \frac{L+1}{2}\right)\pi\right] + 2\sum_{k=1}^{\frac{L-1}{2}} \cos\left\{2\pi\left[\frac{(2k-1)n}{2L} + \frac{k^2}{L+1}\right]\right\}}{\sqrt{2L}}$$

b. for $L \leq n < 2L$, then
  i. $p_r(n)=p_r(n-L)$, and
  ii. $p_i(n)=-p_i(n-L)$.

9. A modem as defined in claim 1 or 2 wherein the training sequence has a period of 2L, L being an integer, and said complex training sequence can be written in the form $p(n)=p_r(n)+jp_i(n)$, where $p_r(n)$ is the real part of the n-th complex signal point, $p_i(n)$ is the imaginary part of the n-th complex signal point, n is a time index and j is equal to $-1$, $p_r(n)$ and $p_i(n)$ having the following form:

a. for $0 \leq n < L$ $$p_r(n) = \frac{1 + \cos\left(\left(n + \frac{L}{2}\right)\pi\right) + 2\sum_{k=1}^{INT\left[\frac{L-1}{2}\right]} \cos\left[\frac{2\pi(kn + k^2)}{L}\right]}{\sqrt{2L}}$$

$$p_i(n) = \frac{\cos\left[\left(n + \frac{L+1}{2}\right)\pi\right] + 2\sum_{k=1}^{INT\left[\frac{L-1}{2}\right]} \cos\left\{2\pi\left[\frac{(2k+(-1)^L)n}{2L} + \frac{k^2}{L}\right]\right\}}{\sqrt{2L}}$$

b. for $L \leq n < 2L$
  i. $p_r(n)=p_r(n-L)$, and
  ii. $p_i(n)=-p_i(n-L)$.
where $INT[(L-1)/2]$ is the largest integer which is less than or equal to $[(L-1)/2]$.

10. A modem as defined in claim 1 or 2 wherein the echo signal includes a near echo having a span of about $N_1T$ and a far echo having a span of about $N_2T$, $N_1$ and $N_2$ being integers and T being the symbol time interval of said training signal sequence, the near echo and the far echo being separated by a delay, BT, and wherein the training sequence is a periodic sequence having a period equal to an integer multiple of a variable L, the modem further comprising:
  a. a computational element for determining the value of the variable L by:
    i. selecting an integer k which is no greater than $(B-N_1)/(N_1+N_2)$; and ii. setting L equal to an integer existing in an interval R which is substantially defined as follows:

$$[(B+N_2)/(k+1)] \leq R \leq [(B-N_1)/k].$$

11. A modem as defined in claim 10 wherein the integer k is the largest integer that is no greater than $(B-N_1)/(N_1+N_2)$.

12. A modem as defined in claim 10 wherein L is selected to be the smallest integer existing in the interval R.

13. A modem as defined in claim 10 wherein the period is equal to 2L.

14. A modem as defined in claim 1 or 2 wherein the far echo may have a phase roll, the operation of the echo canceller module is controlled by specifying an estimate of the phase roll frequency and the computed correlations are used to determine a set of variable coefficients in the echo canceller, the modem further comprising:
 a. a computational element for:
  i. computing a difference in phase between a first set and a second set of echo canceller coefficients, both sets having been generated by the trainer module, the first set of echo canceller coefficients corresponding to a time $T_1$ and the second set of echo canceller coefficients corresponding to a later time $T_2$; and
  ii. dividing the computed phase difference by the time difference, $T_2-T_1$, to arrive at the estimate of the phase roll frequency.

15. A modem as defined in claim 14 wherein the computed phase difference is a weighted average of the phase differences between corresponding elements of the first and second sets of echo canceller coefficients 16. A modem for transmitting signals to and receiving signals from a remote device over a channel, the received signal including a near echo having a span of about $N_1T$ and a far echo having a span of about $N_2T$, $N_1$ and $N_2$ being integers and T being the symbol time interval of said training signal sequence, and the near echo and the far echo being separated by a delay, BT, the modem comprising:
 a. an echo canceller
 b. a training generator for generating a periodic training sequence to train the echo canceller, the periodic sequence having a period equal to an integer multiple of a variable L;
 c. a computational element for determining the value of the variable L by:
  i. selecting an integer k which is no greater than $(B-N_1)/(N_1+N_2)$; and
  ii. setting L equal to an integer existing in an interval R which is substantially defined as follows:
  $[(B+N_2)/(k+1)] \leq R \leq [(B-N_1)/k].$ 17. A modem as defined in claim 16 wherein the integer k is the largest integer that is no greater than $(B-N_1)/(N_1+N_2)$.

18. The modem as defined in claim 16 wherein L is selected to be the smallest integer existing in the interval R.

19. A modem as defined in claim 16 wherein the period is equal to 2L.

20. A modem for transmitting signals to and receiving signals from a remote device over a channel, the received signal including an echo signal which may have an associated phase roll, and the modem including an echo canceller module the operation of which is controlled by specifying a set of echo canceller coefficients and an estimate of the phase roll frequency, the modem comprising:
 a. trainer circuitry for generating a set of echo canceller coefficients based upon the echo present in the received signal;
 b. a computational element for:
  i. computing the difference in phase between a first set and a second set of echo canceller coefficients, both sets having been generated by the trainer circuitry, the first set of echo canceller coefficients corresponding to a time $T_1$ and the second set of echo canceller coefficients corresponding to a later time $T_2$; and
  ii. dividing the computed phase difference by the time difference, $T_2-T_1$, to arrive at the estimate of the phase roll frequency 21. A modem as defined in claim 20 wherein the computed phase difference is a weighted average of the phase differences between corresponding elements of the first and second sets of echo canceller coefficients.

22. A method for training an echo canceller having variable coefficients which may be set to produce an estimate of a real echo signal, the method comprising:
 a. applying a complex training signal sequence to a channel;
 b. receiving a real echo signal on the channel, the echo signal corresponding to the complex training sequence;
 c. computing correlations between the complex training signal sequence and only the corresponding real echo signal; and
 d. setting the variable coefficients based upon the computed correlations.

23. A method for training an echo canceller having variable coefficients which may be set to produce an estimate of a real echo signal, the method comprising:
 a. applying a complex training signal sequence to a channel;
 b. receiving a real echo signal on the channel, the echo signal corresponding to the complex training sequence;
 c. computing correlations between the complex training signal sequence and the corresponding real echo signal; and
 d. setting the variable coefficients based upon the computed correlations,
wherein said complex training sequence has the property that the real and imaginary parts of the sequence are orthogonal to each other so that their cross-correlation is equal to zero.

24. A method as defined in claim 21 or 23 wherein the complex training sequence is periodic.

25. A method as defined in claim 22 wherein the complex training sequence has the property that the real and imaginary parts of the sequence are orthogonal to each other.

26. A method as defined in claim 21 or 23 wherein the complex training sequence has the properties that the autocorrelation of the real part is a first impulse train and the autocorrelation of the imaginary part is a second impulse train.

27. A method as defined in claim 26 wherein the complex training sequence is periodic with a period of 2L, and of the first and the second impulse trains, one is periodic with a period of 2L, and the other is periodic with a period of L, L being an integer.

28. A method as defined in claim 22 or 23 wherein the complex training sequence has a period of 2L, L being an integer, and said complex training sequence can be written in the form $p(n)=p_r(n)+jp_i(n)$, where $p_r(n)$ is the real part of the n-th complex signal point, $p_i(n)$ is the imaginary part of the n-th complex signal point, n is a time index and j is $-1$, p(n) having the following autocorrelation properties:

$$p_r(n) \otimes_{2L} p_r(n) = $$

$$\sum_{k=0}^{2L-1} p_r(k) \times p_r((n+k)_{Mod\, 2L}) = \begin{cases} A & (n)_{Mod\, 2L} = 0, L \\ 0 & \text{elsewhere} \end{cases}$$

$$p_i(n) \otimes_{2L} p_i(n) = $$

$$\sum_{k=0}^{2L-1} p_i(k) \times p_i((n+k)_{Mod\, 2L}) = \begin{cases} A & (n)_{Mod\, 2L} = 0 \\ -A & (n)_{Mod\, 2L} = L \\ 0 & \text{elsewhere} \end{cases}$$

$$p_r(n) \otimes_{2L} p_i(n) = \sum_{k=0}^{2L-1} p_r(k) \times p_i((n+k)_{Mod\, 2L}) = 0 \text{ for all } n.$$

where:

$\otimes_{2L}$ denotes a circular correlation operation,
$A$ is a positive constant, and
$()_{MOD\, 2L}$ denotes a modulo 2L operation used by the circular correlation operation.

29. A method as defined in claim 22 or 23 wherein the training sequence has a period of 2L, L being an integer, and said complex training sequence can be written in the form $p(n)=p_r(n)+jp_i(n)$, where $p_r(n)$ is the real part of the n-th complex signal point, $p_i(n)$ is the imaginary part of the n-th complex signal point, n is the time index and j is equal to $-1$, $p_r(n)$ and $p_i(n)$ having the following form:

a. for $0 \leq n < L$ and
  i. if L is even, then $$p_r(n) = \frac{1 + \cos\left(\left(n + \frac{L}{2}\right)\pi\right) + 2\sum_{k=1}^{\frac{L}{2}-1} \cos\left[\frac{2\pi(kn + k^2)}{L}\right]}{\sqrt{2L}}$$

$$p_i(n) = \frac{2\sum_{k=0}^{\frac{L}{2}-1} \cos\left[\frac{\pi((2k+1)n + 2k^2)}{L}\right]}{\sqrt{2L}} \text{ and}$$

ii. if L is odd, then $$p_r(n) = \frac{1 + 2\sum_{k=1}^{\frac{L-1}{2}} \cos\left[2\pi\left(\frac{kn}{L} + \frac{k^2}{L+1}\right)\right]}{\sqrt{2L}}$$

$$p_i(n) = \frac{\cos\left[\left(n + \frac{L+1}{2}\right)\pi\right] + 2\sum_{k=1}^{\frac{L-1}{2}} \cos\left\{2\pi\left[\frac{(2k-1)n}{2L} + \frac{k^2}{L+1}\right]\right\}}{\sqrt{2L}}$$

b. for $L \leq n < 2L$, then
  i. $p_r(n) = p_r(n-L)$, and
  ii. $p_i(n) = -p_i(n-L)$.

30. A method as defined in claim 22 or 23 wherein the training sequence has a period of 2L, L being an integer, and said complex training sequence can be written in the form $p(n)=p_r(n)+jp_i(n)$, where $p_r(n)$ is the real part of the n-th complex signal point, $p_i(n)$ is the imaginary part of the n-th complex signal point, n is a time index and j is equal to $-1$, $p_r(n)$ and $p_i(n)$ having the following form:

a. for $0 \leq n < L$ $$p_r(n) = \frac{1 + \cos\left(\left(n + \frac{L}{2}\right)\pi\right) + 2\sum_{k=1}^{INT\left[\frac{L-1}{2}\right]} \cos\left[\frac{2\pi(kn + k^2)}{L}\right]}{\sqrt{2L}}$$

$$p_i(n) = \frac{\cos\left[\left(n + \frac{L+1}{2}\right)\pi\right] + 2\sum_{k=1}^{INT\left[\frac{L-1}{2}\right]} \cos\left\{2\pi\left[\frac{(2k+(-1)^L)n}{2L} + \frac{k^2}{L}\right]\right\}}{\sqrt{2L}}$$

b. for $L \leq n < 2L$
  i. $p_r(n) = p_r(n-L)$, and
  ii. $p_i(n) = -p_i(n-L)$.

where $INT[(L-1)/2]$ is the largest integer which is less than or equal to $[(L-1)/2]$.

31. A method as defined in claim 22 or 23 wherein the echo signal includes a near echo having a span of about $N_1T$ and a far echo having a span of about $N_2T$, $N_1$ and $N_2$ being integers and T being the symbol time interval of the training sequence, the near echo and the far echo being separated by a delay, BT, and wherein the training sequence is a periodic sequence having a period equal to an integer multiple of a variable L, the method further comprising:

a. selecting an integer k which is no greater than $(B-N_1)/(N_1+N_2)$; and b. setting L equal to an integer existing in an interval R which is substantially defined as follows:

$$[(B+N_2)/(k+1)] \leq R \leq [(B-N_1)/k].$$

32. A method as defined in claim 31 wherein the integer k is the largest integer that is no greater than $(B-N_1)/(N_1+N_2)$.

33. A method as defined in claim 31 wherein L is selected to be the smallest integer existing in the interval R.

34. A method as defined in claim 31 wherein the period is equal to 2L.

35. A method as defined in claim 21 or 23 wherein the far echo may have a phase roll, the operation of the echo canceller is controlled by specifying an estimate of the phase roll frequency and the computed correlations are used to determine the echo canceller coefficients, the method further comprising:
  a. computing the difference in phase between a first set and a second set of echo canceller coefficients, both sets having been generated by the trainer module, the first set of echo canceller coefficients corresponding to a time $T_1$ and the second set of echo canceller coefficients corresponding to a later time $T_2$; and
  b. dividing the computed phase difference by the time difference, $T_2-T_1$, to arrive at the estimate of the phase roll frequency.

36. A method as defined in claim 35 wherein the computed phase difference is a weighted average of the phase difference between corresponding elements of the first and second sets of echo canceller coefficients.

37. A method for computing a period used to construct a periodic training sequence for training an echo canceller, the training sequence being applied to a channel and resulting in a corresponding echo signal including a near echo having a span of about $N_1T$ and a far echo having a span of about $N_2T$, $N_1$ and $N_2$ being integers and T being the symbol time interval of the training sequence, and the near echo and the far echo being separated by a delay, BT, the method comprising:
  a. selecting an integer k which is no greater than $(B-N_1)/(N_1+N_2)$; and
  b. setting the period equal to an integer multiple of an integer existing in an interval R which is substantially defined as follows;

$$[(B+N_2)/(k+1)] \leq R \leq [(B-N_1)/k].$$

38. A method as defined in claim 37 wherein the integer k is the largest integer that is no greater than $(B-N_1)/(N_1+N_2)$.

39. A method as defined in claim 37 wherein L is selected to be the smallest integer existing in the interval R.

40. A method as defined in claim 37 wherein the integer multiple is equal to 2.

41. A method for estimating a phase roll of an echo signal received by a modem, the modem including an echo canceller the operation of which is controlled by specifying a set of echo canceller coefficients and an estimate of the phase roll frequency, the method comprising:
  a. generating a first and a second set of echo canceller coefficients based upon the received echo signal, the first set corresponding to time $T_1$ and the second set corresponding to a time $T_2$;
  b. computing the difference in phase between the first set and the second set of echo canceller coefficients; and
  c. dividing the computed phase difference by the time difference, $T_2-T_1$, to arrive at the estimate of the phase roll frequency.

42. A method as defined in claim 41 wherein the computed phase difference is a weighted average of the phase differences between corresponding elements of the first and second sets of echo canceller coefficients.

* * * * *

UNITED STATES PATENT AND TRADEMARK OFFICE
CERTIFICATE OF CORRECTION

PATENT NO. : 4,987,569

DATED : January 22, 1991

INVENTOR(S) : Fuyun Ling and Guozhu Long

It is certified that error appears in the above-identified patent and that said Letters Patent is hereby corrected as shown below:

Col. 2, line 3, "10" should be deleted.

Col. 4, line 10, the comma should not be there.

Col. 8, lines 27, 57, 68 "$\leq$" (second occurrence) should be --<--.

Col. 9, line 15, "$\leq$" (second occurrence) should be --<--.

Col. 9, line 56, the period is missing after "transmitted".

Col. 9, line 67, "INT" should be --$\overline{INT}$--.

Col. 10, line 53, "$N^1$" should be --$N_1$--.

Col. 10, line 63, "echoed" should be --echoes--.

Col. 11, line 52, the period is missing after "enough".

Col. 11, line 56, "a" should be --8--.

Col. 11, line 66, ">" should be --$\geq$--.

Col. 12, line 10, the period is missing after "sequence".

Col. 13, line 40, "$C_{m,r}^2$" (second occurrence) should be --$C_{m,i}^2$--.

UNITED STATES PATENT AND TRADEMARK OFFICE
CERTIFICATE OF CORRECTION

PATENT NO. : 4,987,569

DATED : January 22, 1991

INVENTOR(S) : Fuyun Ling and Guozhu Long

It is certified that error appears in the above-identified patent and that said Letters Patent is hereby corrected as shown below:

Col. 13, line 41, "$\omega$" should be --$\phi$--.

Col. 15, line 53, "0" should be --( )--.

Col. 16, line 25, "and" is missing before "b."

Col. 18, line 53, "21" should be --22--.

Col. 18, line 59, "21" should be --22--.

Col. 19, line 54, "0" should be --( )--.

Signed and Sealed this

Second Day of February, 1993

Attest:

STEPHEN G. KUNIN

*Attesting Officer*  Acting Commissioner of Patents and Trademarks